(12) United States Patent
Price

(10) Patent No.: US 6,648,008 B1
(45) Date of Patent: Nov. 18, 2003

(54) METHOD AND APPARATUS FOR WASH WATER CONTAINMENT AND DISPOSAL

(76) Inventor: Kerrigan McGrew Price, 1488 Olivet Rd., Santa Rosa, CA (US) 95401

( * ) Notice: Subject to any disclaimer, the term of this patent is extended or adjusted under 35 U.S.C. 154(b) by 0 days.

(21) Appl. No.: 10/143,460

(22) Filed: May 10, 2002

Related U.S. Application Data

(60) Provisional application No. 60/290,515, filed on May 10, 2001.

(51) Int. Cl.[7] .............................. B08B 3/02; B08B 3/04; B08B 9/00
(52) U.S. Cl. ..................... 137/312; 134/104.2; 134/109; 134/111; 134/123; 137/341; 137/565.01; 141/86; 141/313
(58) Field of Search .............................. 134/104.2, 111, 134/109, 123; 137/312, 565.01, 341; 141/86, 311 A, 313; 210/258, 265

(56) References Cited

U.S. PATENT DOCUMENTS

| | | | |
|---|---|---|---|
| 5,462,655 A | * 10/1995 | Ladd et al. ................. | 210/167 |
| 5,560,782 A | * 10/1996 | Latimer ...................... | 134/123 |
| 5,597,001 A | * 1/1997 | Rasmussen et al. ..... | 134/104.2 |
| 5,797,994 A | * 8/1998 | Rasmussen .............. | 134/104.2 |
| 5,816,743 A | * 10/1998 | Schmitz, Jr. ................ | 137/312 |
| 6,021,792 A | * 2/2000 | Petter et al. ............. | 134/104.2 |
| 6,164,298 A | * 12/2000 | Petter et al. ............. | 134/104.4 |

* cited by examiner

Primary Examiner—George L. Walton
(74) Attorney, Agent, or Firm—Larry D. Johnson; Craig M. Stainbrook; Johnson & Stainbrook, LLP

(57) ABSTRACT

A portable wash water containment apparatus having a flat ground cover portion surrounded by an integral berm formed from the ground cover material, said berm defines the area of the apparatus in which contaminated are contained. Dual ramp assemblies are provided to allow ingress and egress from the containment mat without damaging the berm or ground cover portions. A pump system is included to provide oil/water separation before discharging waste water into a sewer system. The containment mat may also be equipped with electrical heating elements to facilitate use in extreme cold temperatures.

15 Claims, 4 Drawing Sheets

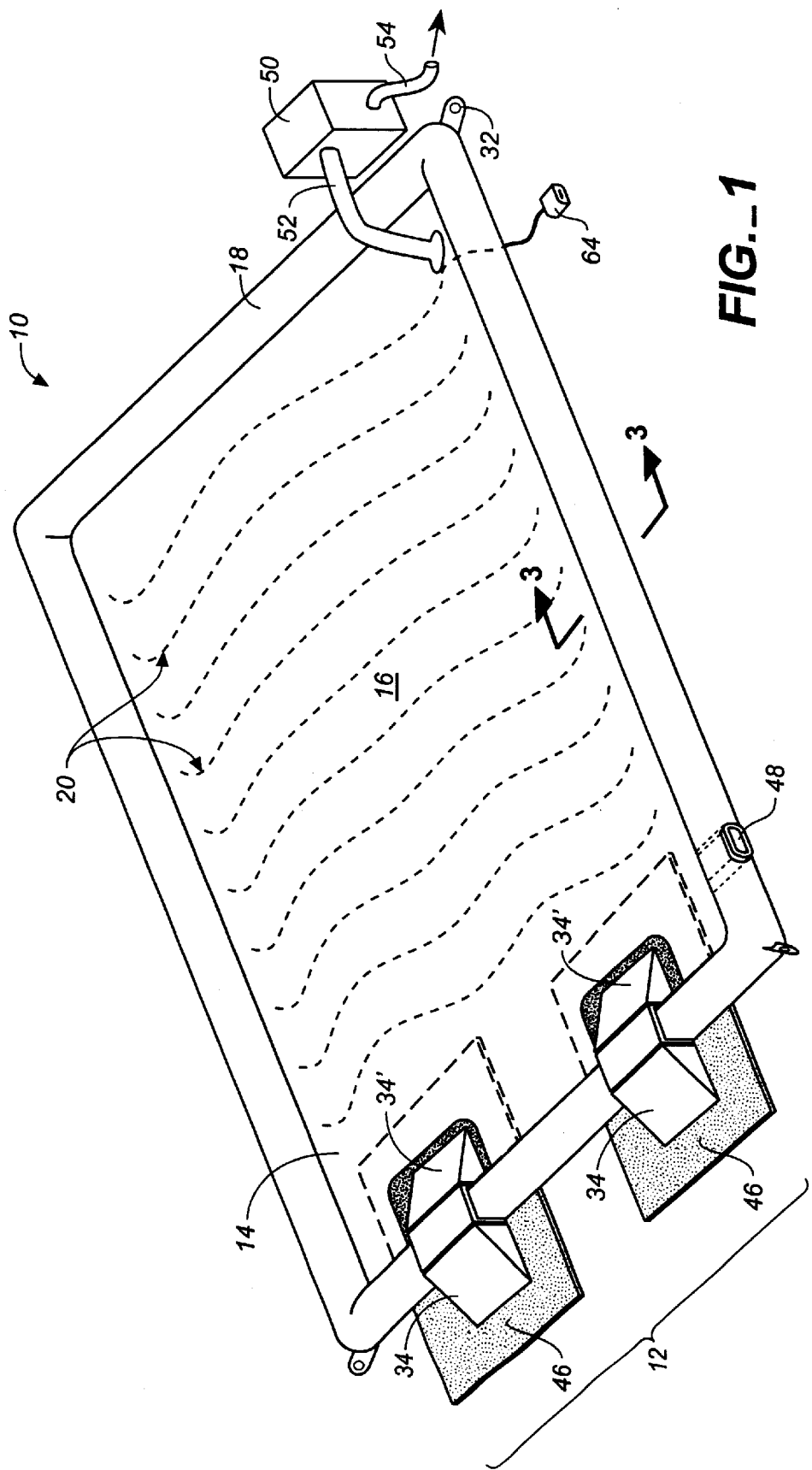
FIG._1

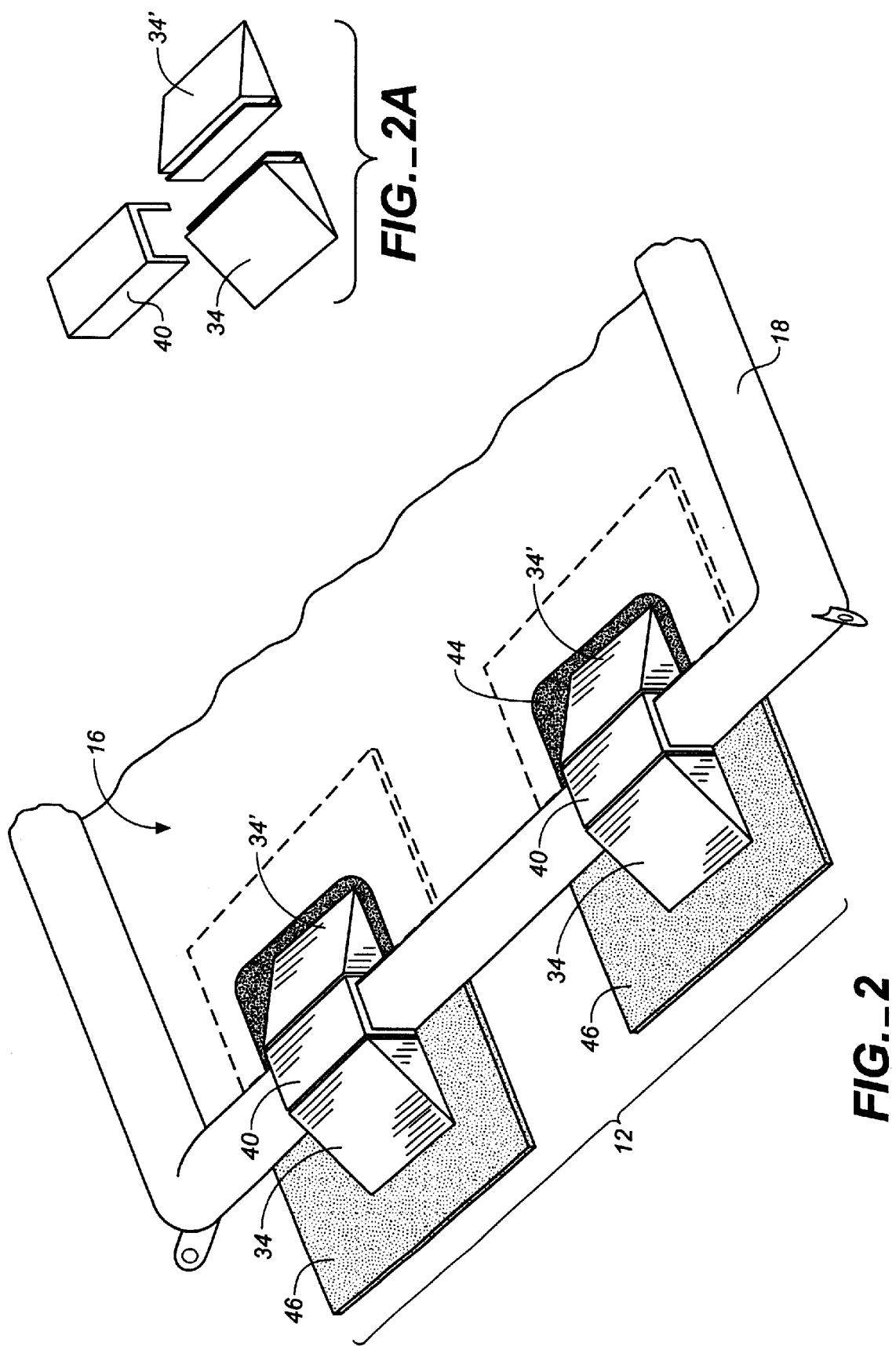

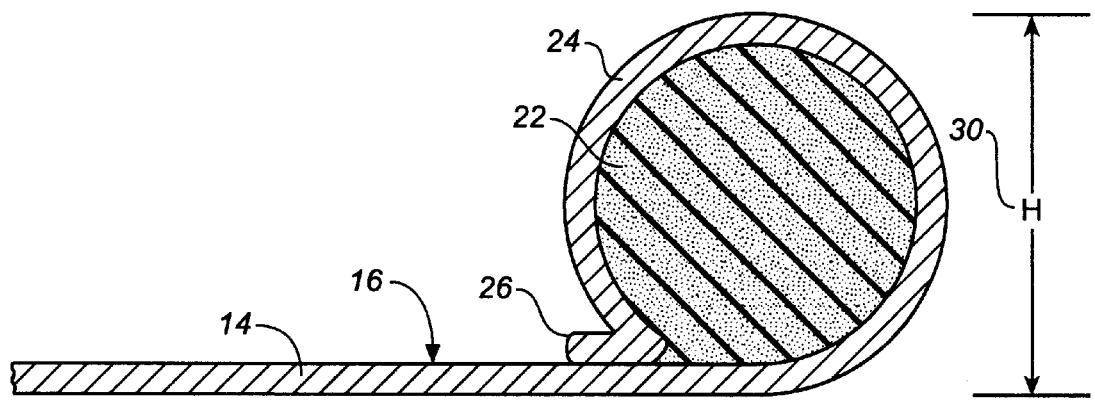
FIG._3
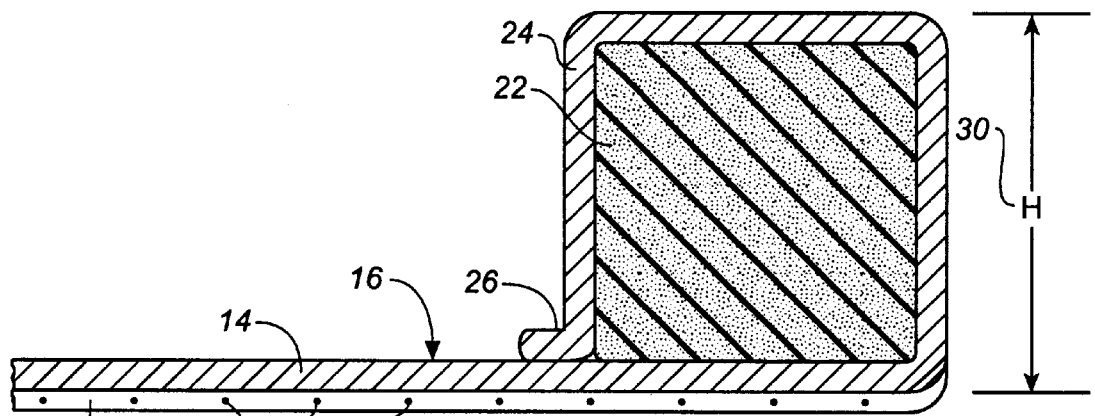
FIG._3A
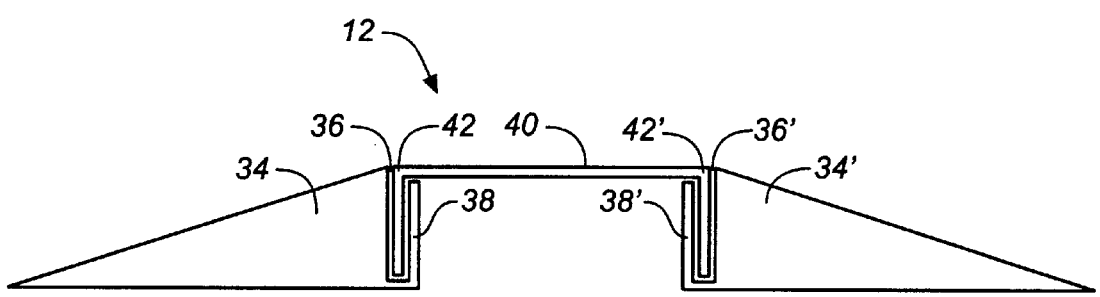
FIG._4

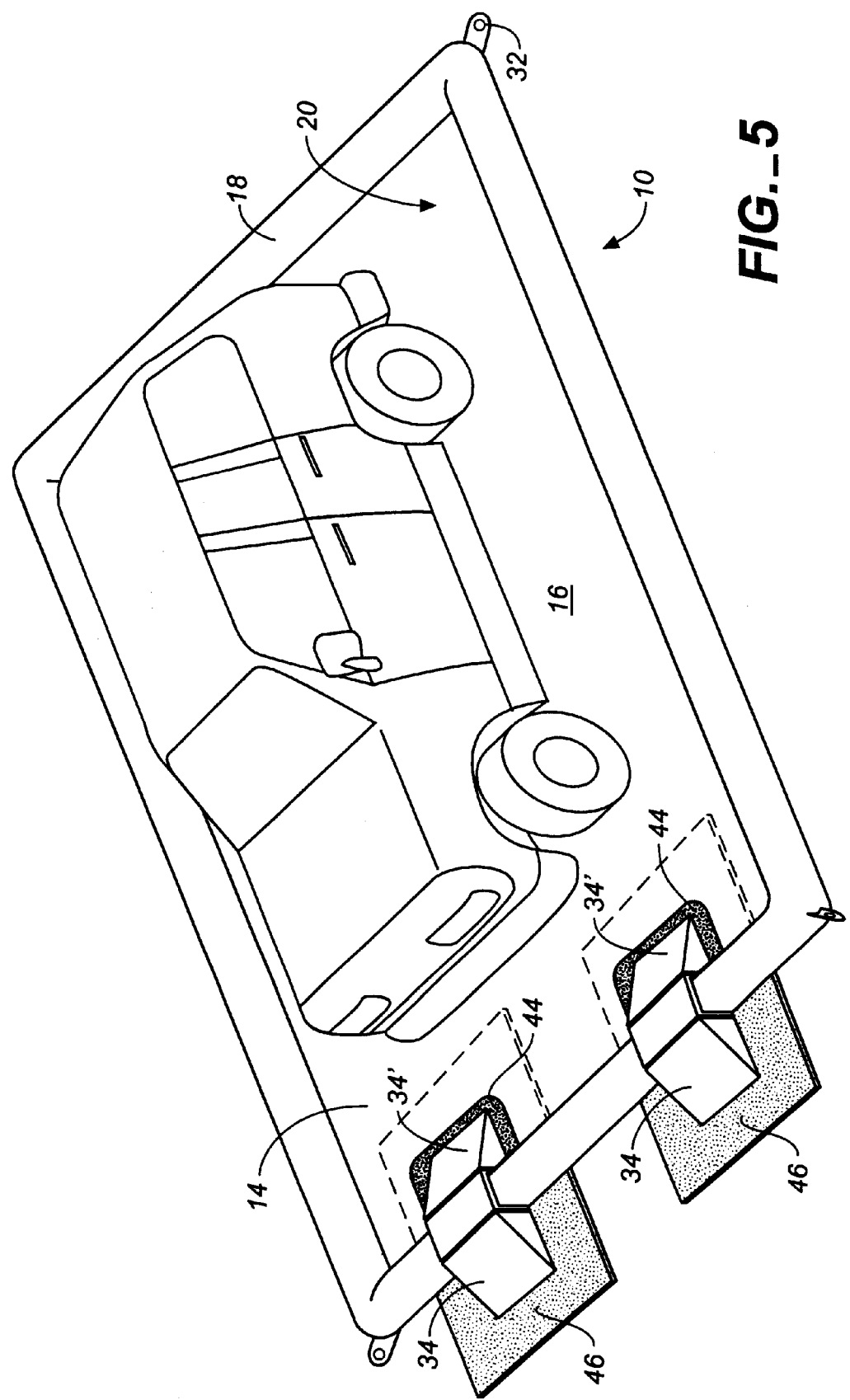

METHOD AND APPARATUS FOR WASH WATER CONTAINMENT AND DISPOSAL

CROSS REFERENCE TO RELATED APPLICATIONS

The present application claims the benefit of the filing date of U.S. Provisional Patent Application Ser. No. 60/290,515, filed May 10, 2001.

STATEMENT REGARDING FEDERALLY SPONSORED RESEARCH OR DEVELOPMENT

Not applicable.

REFERENCE TO A MICROFICHE APPENDIX

Not applicable.

1. Technical Field

The present invention relates generally to fluid retention devices, and more particularly to a portable wash water containment apparatus adapted to collect, contain, and facilitate the disposal of, contaminated wash water which drains from vehicles and other relatively large articles; and even more particularly to a wash water containment apparatus adapted for use in cold weather conditions.

2. Background Information and Discussion Art

Local and regional environmental regulations increasingly prohibit residents and commercial establishments from using municipal sewers for the disposal of waste water resulting from vehicle washing. Some vehicle washing facilities are located on highly permeable ground, such as asphalt, sand, or dirt, and the numerous contaminants that drip from washed motor vehicles can percolate down to vulnerable shallow water tables and underground streams. Accordingly, it is now common for commercial vehicle washing facilities to collect the waste water in a reservoir for disposal through an approved method and at an approved treatment facility. However, when a commercial facility is either not physically or practically available, containment and disposal methods must be employed that still comply with applicable environmental regulations.

The need for portable fluid containment systems for vehicles and other contamination-bearing articles has been recognized for several years. Several methods have been proposed to address this need, most notably including the systems disclosed and taught in U.S. Pat. No. 5,560,782 to Latimer, issued Oct. 1, 1996, and titled, "Method and apparatus for treating articles with wash water or other fluid," and the system disclosed in U.S. Pat. No. 5,797,994 to Rassmussen, issued Aug. 25, 1998, and entitled, "Fluid Retention System."

Latimer discloses a method for washing an article and collecting the used wash water as well as a wash pad and a mobile apparatus. A wash truck is modified to include a water treatment unit and a submersible pump for removing used wash water from a water-proof surface, such as pavement or the wash pad. The used wash water is subsequently recycled and reused or disposed of without harm to the environment. The wash pad includes a bottom sheet and a containment wall that together define a containment area for containing the used wash water. A secondary containment area may be defined for wash pads that are used for the washing of vehicles. The wash pad may be rolled for storage upon a reel mounted to the wash truck. Other embodiments provide wash pads for use in washing rail-mounted articles, and the interiors of trailers and shipping containers.

While Latimer provides many advantageous features, it also carries with it many liabilities. For instance, the apparatus in Latimer includes containment pad walls that are resiliently deformable by a vehicle which enters and exits the containment pad area. While this facilitates the movement of the vehicle onto and off of the pad, it also allows for contaminated water to escape the confines of the containment pad unless all of the water has been removed before the vehicle is driven off. This results in wasted time and imports the risk of losing a considerable amount of contaminated fluids. The wash water containment apparatus of the present invention solves this problem and provides a practical alternative to Latimer and similar systems.

Rassmussen discloses a fluid retention station for containing fluid washed, flushed or drained from a vehicle. The station includes a plurality of layers for providing a floor to overlie existing terrain and includes at least a berm pad layer and a porous layer. The berm pad layer contains a floor and walls which provide a fluid tight enclosure. The porous layer overlays the berm pad layer and receives the fluid and allows the fluid to flow through to the berm pad layer. The porous layer removes any contaminants too large to pass through the porous layer or which have an affinity for a surface of the porous layer. A ground pad layer may also be used to underlie the berm pad layer. In addition, a track layer may be used to overlay a portion of the flooring to protect it from the vehicle or other equipment. A vehicle or other equipment is placed on the flooring layers within the enclosure where fluid from the vehicle is retained rather than being allowed to run onto the underlying terrain where it can present environmental problems or be difficult to clean up. The fluid retention station of Rassmussen includes a containment mat of the kind employed in the present invention, but does not teach an apparatus adapted for use in cold weather conditions. Further, the combination porous layer and bottom layer must be of substantial thickness to be effective, thus rendering the entire apparatus heavy, unwieldy, and ultimately ill-suited as a portable station.

BRIEF SUMMARY OF THE INVENTION

Accordingly, the wash water containment apparatus of the present invention provides a portable, lightweight modular system which is compact when stored, easy to set up, and does not require the assembly of component parts. The inventive apparatus generally comprises a planar ground cover portion surrounded by an integral berm formed from the ground cover material. The berm defines the containment area of the apparatus into which contaminated fluids flow and are contained. The berm is preferably formed by a foam roll inserted into a sleeve portion of containment barrier floor. The foam insert or roll is flexible so as to permit folding and collapsing of the apparatus for storage and transportation. Grommets are provided at the corners to allow stays or stakes to secure the apparatus to the ground surface.

The containment system further includes dual ramp assemblies to prevent crushing or deformation of the berm as vehicles enter and exit the washing and water containment area. The ramp assemblies includes two ramps having insert channels for securing a U-shaped bridge. Rubber mats are placed under the interior ramps to prevent damage to the material when under vehicle loads.

A pump system is optionally included when flow rates dictate such use or when contaminated water contains sufficient amounts of oil and grease to warrant oil/water separation before discharging the waste water into a sewer system. The containment mat may also be equipped with electrical heating elements to facilitate use under extremely cold conditions.

BRIEF DESCRIPTION OF THE SEVERAL VIEWS OF THE DRAWINGS

FIG. 1 is a front perspective view of the wash water containment and disposal apparatus of the present invention, including;

FIG. 2 is a perspective view of the ramp-and-pad vehicle entry system employed in the present invention;

FIG. 2A is a perspective view of the front end of the wash water containment apparatus of FIG. 1, showing detail of the ramp system;

FIG. 3 is a cross-sectional side view in elevation of the berm and containment pad floor of the containment apparatus;

FIG. 3A is a cross-section side view in elevation as in FIG. 3, in which the containment pad floor is underlain by a heating element layer;

FIG. 4 is a side view in elevation showing detail of the vehicle entry ramp of the present invention; and FIG. 5 is a perspective view side view in elevation of the diamond plate ramp assembly.

DETAILED DESCRIPTION OF THE INVENTION

Referring to FIGS. 1 through 5, wherein like reference numerals refer to like components in the various views, FIG. 1 is a front perspective view of the wash water containment apparatus 10 of the present invention, and FIG. 2 is a perspective view of the ramp-and-pad vehicle entry system 12 employed in the present invention. FIG. 2A is a perspective view showing detail of the diamond-plate ramp and bridge system comprising the essential part of the containment entry apparatus. In the drawings, the material containment mat is shown as being rectangular in shape, and though this shape is preferable and particularly well-suited for use as a portable apparatus for containing wash water from vehicles, other shapes may be employed for use in washing other kinds of articles, such as engines and other heavy equipment, planes, bicycles, and the like. Additionally, though the preferred material of which the barrier is fabricated is 22-ounce coated vinyl, other waterproof materials may be substituted to achieve the desired result. The fundamental requirement is that the material be waterproof, but supple and flexible enough to be folded and collapsed for transporting.

The inventive apparatus is fully portable and can be folded several times into a substantially smaller footprint than when in its deployed configuration. When deployed for use, the wash water containment apparatus includes a substantially flat and substantially rectangular ground cover portion 14 having an upper surface 16 and surrounded on its perimeter by a berm 18 on all sides of the ground cover portion. The berm defines the containment area 20 of the containment apparatus into which contaminated fluids are flushed and/or drip from a washed article.

FIG. 3 is a partial cross-sectional side view in elevation of the berm and ground cover portion of the containment apparatus. This view shows that the berm is formed by a foam roll 22 inserted into a sleeve portion 24 created in the containment barrier floor 14 by permanently approximating the overlapping surface portion 26 of the ground cover portion 14 to its interior upper surface 16. Numerous means may be employed for so affixing the surfaces, including but not limited to stapling and/or gluing and/or chemical/ material welding. The foam roll 22 can be generally circular in cross section or any of a number of other suitable shapes having a sufficient height 30, as there is nothing imperative in the shape that affects the functionality of the berm. FIG. 3A shows an alternative, substantially square berm profile. The foam insert or roll is flexible to facilitate the folding and collapsing of the containment apparatus for storage and transportation. For convenience and to stabilize the device, grommets 32 are provided at each corner of the containment mat.

It will be readily appreciated by those experienced in the technology of the instant invention that when the containment apparatus contains a significant amount of waste water, the water will escape from the apparatus if a vehicle is driven over the berm in order to depart the containment area. Accordingly, the instant invention includes at least one 50/52 aluminum alloy diamond-plate dual ramp assembly 12 to prevent deformation of the berm during vehicle ingress and egress. While one ramp assembly may be employed, two dual ramp assemblies are preferred as they can be spaced according to the axle width of the vehicle to be washed.

Referring now to FIG. 4, each ramp assembly includes a first and second ramp 34, 34', each having a channel 36, 36' defined by a lip or flange 38, 38', connected by an inverted U-shaped bridge 40 having arms 42, 42' which insert into channels 36, 36'. As shown in FIGS. 1, 2 and 5, a rubber mat 44 is positioned underneath the second, interior ramp 34' so that the edges of the ramp do not cut the material barrier when under the load of a vehicle. Further, when ground surface conditions so require, or when vehicle loads are significant, a second material pad 46 may be placed under the entire ramp assembly and underneath the ramp area of the ground cover portion 14 of the mat to prevent ramp movement as a vehicle passes over the ramp; this also prevents damage to the mat itself when placed under heavy loads.

The ramp assemblies increase the convenience of using the entire system, inasmuch as multiple vehicles may be washed before the containment apparatus is emptied. However, contaminated wash water may also be pumped from the containment area 20 during the washing process when heavy runoff threatens overflow. Ordinarily the containment mat will be positioned on a surface having some measure of grade, however slight. In such a condition wash water will migrate to any low spot on the containment barrier floor where it can be conveniently emptied through a selectively sealable drain 48 or by pumping the collected water from the mat with a pump 50 (see FIG. 1).

Under most circumstances, wash water from vehicles and other machinery will include significant amounts of oil and grease. Accordingly, a pump system best suited to the operation for which the present invention is intended is a high flow pump having oil/water separator elements, as is described in U.S. Pat. No. 5,401,404, which is incorporated in its entirety by reference herein. Accordingly, contaminated water can be removed from the containment mat through an intake hose 52 and passed through the pump/oil separator unit 50, after which water can be discharged through outlet hose 54 and directed to a sewer drain or other waste water outlet.

It will also be appreciated by those with skill in the art that many wash operations must be conducted under very cold temperatures. Cold ground surfaces and air temperatures often make waste water handling difficult and ineffective. Accordingly, as is shown in FIG. 3A, the ground cover portion 14 of the containment apparatus may be underlain with a second material layer 60 having electrical resistance heating elements 62 in electrical communication with a power source through a power cord 64. This layer may be separable from the ground cover portion of the mat, or it may be permanently affixed to the ground cover portion. Alternatively, the heating elements may be incorporated into the ground cover portion 14 of the containment mat.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A wash water containment apparatus, comprising:
   a ground cover portion having an upper surface and surrounded on its perimeter by a berm, said berm defining a waste water containment area; and
   a vehicle ingress-egress ramp assembly comprising at least one exterior ramp having a channel, at least one interior ramp having a channel, and an inverted U-shaped bridge having arms which insert into said channels to form a bridge between said interior and exterior ramps.

2. The wash water containment apparatus of claim 1, wherein said ramp assembly further includes a mat positioned underneath said interior ramp and atop said upper surface of said ground cover portion of said apparatus.

3. The wash water containment apparatus of claim 1, wherein said ramp assembly further includes a second material pad positioned under said ramp assembly and under said ground cover portion of said apparatus.

4. The wash water containment apparatus of claim 1, wherein said berm is formed by a foam roll inserted into a sleeve portion created in the ground cover portion of said apparatus by permanently affixing an overlapping surface portion of the ground cover portion to said upper surface.

5. The wash water containment apparatus of claim 4, wherein said foam roll is circular in cross section.

6. The wash water containment apparatus of claim 4, wherein said foam roll is substantially square in cross section.

7. The wash water containment apparatus of claim 1, wherein said berm includes a selectively sealable drain.

8. The wash water containment apparatus of claim 1, wherein said ramp assemblies are fabricated of 50/52 aluminum alloy diamond-plate.

9. The wash water containment apparatus of claim 1, further including a pump having oil/water separator elements, said pump in fluid communication with the waste water containment area of said apparatus.

10. The wash water containment apparatus of claim 1, further including heating elements for heating said ground cover portion of said apparatus.

11. The wash water containment apparatus of claim 10, wherein said heating elements are incorporated into a material layer positioned under said ground cover portion.

12. The wash water containment apparatus of claim 11, wherein said heating element layer is affixed to said ground cover portion.

13. The wash water containment apparatus of claim 10, wherein said heating elements are incorporated into said ground cover portion.

14. The wash water containment apparatus of claim 10, wherein said heating elements are electrical resistance heating elements.

15. The wash water containment apparatus of claim 1, further including at least one grommet integral with said berm.

* * * * *